United States Patent [19]

Mella

[11] 4,269,582
[45] May 26, 1981

[54] PASTA-MAKING MACHINE
[76] Inventor: Mario Mella, Via Curtatone 11, Desenzano (Brescia), Italy
[21] Appl. No.: 96,176
[22] Filed: Nov. 20, 1979
[30] Foreign Application Priority Data
Nov. 21, 1978 [IT] Italy ............................... 7122/78[U]
Dec. 29, 1978 [IT] Italy ............................... 7152/78[U]
[51] Int. Cl.³ .............................................. A21C 3/04
[52] U.S. Cl. ...................................... 425/190; 366/77; 366/91; 366/92; 366/187; 366/196; 366/299; 425/204; 425/205
[58] Field of Search ...................... 425/204, 205, 190; 366/91, 92, 77, 187, 196, 299

[56] References Cited
U.S. PATENT DOCUMENTS
1,993,528 3/1935 Roser ................................. 366/92
2,531,224 11/1950 Lenner ............................... 425/204

FOREIGN PATENT DOCUMENTS
556067 4/1957 Belgium .................................. 425/205
466987 2/1929 Fed. Rep. of Germany ........... 425/205
982575 6/1951 France .................................... 425/205
1150253 1/1958 France .................................... 425/204

Primary Examiner—James H. Derrington

[57] ABSTRACT

A pasta making machine is provided with a body portion having a kneading chamber and an extrusion chamber therein with a passageway interconnecting the two chambers. The body portion is mounted on a base and is adapted for rotation about a horizontal axis whereby a conveyor member in the extrusion chamber is located above kneading means located in the kneading chamber during the kneading phase. During the extrusion phase, the conveyor member, by virtue of rotation of the body portion is located below the kneading chamber.

15 Claims, 7 Drawing Figures

PASTA-MAKING MACHINE

This invention relates to a machine for both domestic and commercial use, for mixing and producing pasta of any type by extrusion through a die.

Already known is a type of machine for producing pasta having mixing kneading means for the kneeding of the ingredients and extruding means for the formation of the type of pasta desired from time to time. The said mixing means and the said extruding means have their axes perpendicular to one another, or else the mixing means operate in a kneading chamber having a vertical axis while the extruding means operate in a corresponding extruding chamber having a substantially horizontal axis and communicating with the said vertical chamber through an opening fitted with an openable gate valve. Such a design, however, entails drawbacks both as regards the control of the mixing and extruding means with axes perpendicular to one another and as regards the passage of the dough from the kneading chamber to the extrusion chamber, which is always difficult to achieve. This results in a machine that is relatively complex and costly but still does not perform suitably.

The aim of this invention, however, is to produce a machine for making pasta that is simpler and more economical to produce and reliable in terms of operation, in which the kneading-mixing means and the conveying means for extrusion are parallel to one another and operate in two chambers that communicate with one another and are superimposed one above and parallel to one another.

In a first embodiment the body with the chamber for the extruding means is stationary and maintains the same position at all times both during the kneading phases and during the pasta-shaping phases.

In a design variant the body with the chamber for the kneading means and the extruding means is capable of revolving about a horizontal pivoting axis in order for the extruding means to be above the kneading means during the kneading phases and vice versa during the phases of extrusion for the shaping of the pasta.

Examples of practical embodiments of the machine under discussion will be described with what follows, in reference to the attached drawing given by way of example and without limitation, in which.

Figure 2:
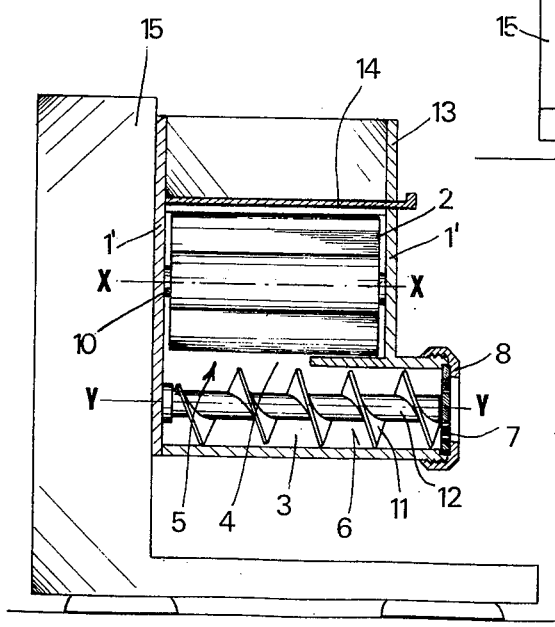

The machine in question comprises a stamped body (1) that is preferably, although not necessarily, made of a suitable plastic material, in which there are two chambers (2, 3) of different sizes, having axes x-x and y-y that are horizontal and parallel to one another, with the said chambers communicating with one another through an intermediate passage (4) covering part of the length of the two chambers, as illustrated in FIG. 2, or else the entire length of the said chambers.

Chamber (2) of the body (1) has in it an opening or mouth (13) which serves for introducing into the said chamber the ingredients (flour, eggs, water) to be mixed into dough and which can be closed by means of a gate (14) or by means of a cover.

Mounted in chamber (2) are kneading means (5) whereas in chamber 3 there is mounted a conveyor member (6) for displacing the dough toward an extruding plate or die (7) mounted by means of a locking ring (8) on the end of the said chamber (3). The axes of the kneading means (5) and the conveyor member (6) are parallel to one another and horizontal or nearly horizontal and are driven simultaneously by a geared motor (not illustrated) enclosed in a base (15) supporting the machine.

More particularly, the kneading means (5) are constituted by a pair of toothed rollers (9, 9') having two or more rounded teeth with shafts (10, 10') supported between the heads or axially spaced apart end plates (1') of the body (1), with the said gears rotating in opposite directions and working together so as to mix and knead the dough suitably.

The conveyor member (6) consists of an Archimedean screw (11), either single-start or multi-start, with a shaft (12) that coincides with the axis y-y of the chamber (3).

It is advantageous for the machine described above to be applied to the base (12) in a removable arrangement so as to be able to be separated easily and make it possible to use the said base with other appliances for household use, such as meat grinders, graters, etc., which can be driven by the same motor unit housed in the base.

Figure 1:
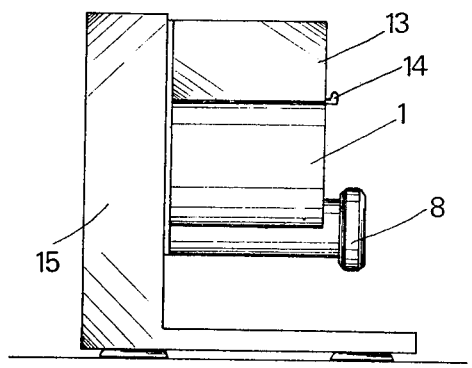
FIG. 1 shows an exterior side elevational view of the machine with a stationary body.
Figure 3:
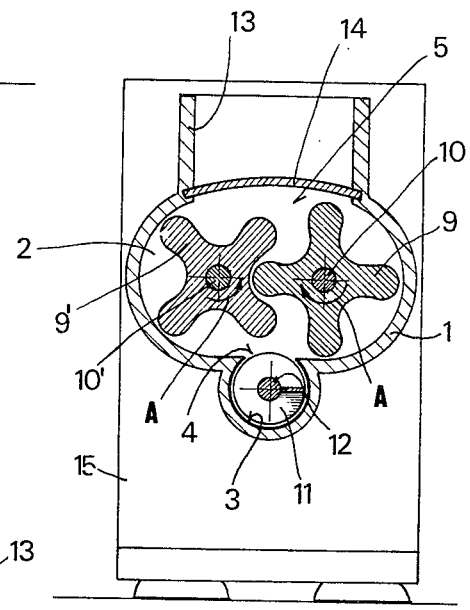
FIGS. 2 and 3 show, respectively, a longitudinal vertical section thereof and a cross section thereof.

However, in the embodiment in accordance with FIGS. 1 to 3 the body (1) is applied to the base (15) in a stationary manner in order to maintain the same position at all times during every phase of production of the pasta. It is further provided that the gears (9,9') rotate in one direction (arrow A in FIG. 3) during kneading and in the opposite direction for extending the dough through the die.

In this way the ingredients which are to form the pasta are mixed and kneaded in chamber (2) by causing the mixing-kneading means (5) to rotate, or in other words by causing the gears to rotate in the direction of the arrow A, which corresponds to a rotation of the Archimedean screw in the direction opposite to that with which the dough is conveyed toward the extruding die (7). The dough is thus appropriately kneaded, while what passes into the chamber (3) is sent back by the screw (11).

Once the kneading phase has been completed, the mixing means (8) and the conveyor member (9) are caused to rotate in the direction opposite to the above so that the dough gradually passes through the passage (4) from chamber (2) to chamber (3), where the screw conveyor (16) now ensures the displacement of the dough toward the extruding die (7) in order to produce pasta in the desired shape.

Figure 4:
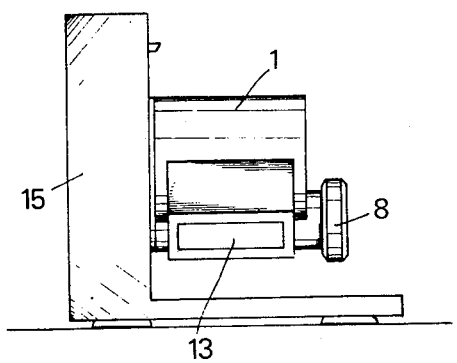
FIG. 4 shows an exterior side elevational view of a machine with a body that is capable of being turned over.
Figure 7:
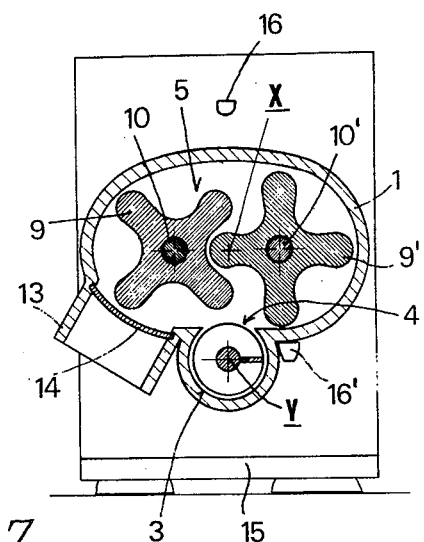
FIGS. 6 and 7 show in cross section the machine in FIG. 4 respectively in the kneading position and the pasta-extruding position.
Figure 5:
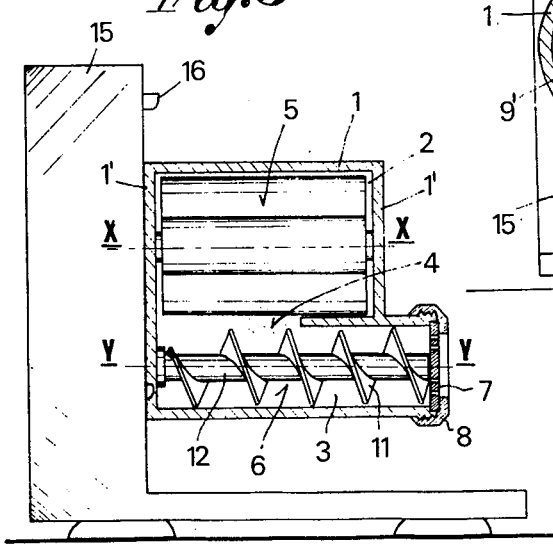
FIG. 5 shows a longitudinal vertical section of the machine in FIG. 4 in the pasta-extruding position.
Figure 6:
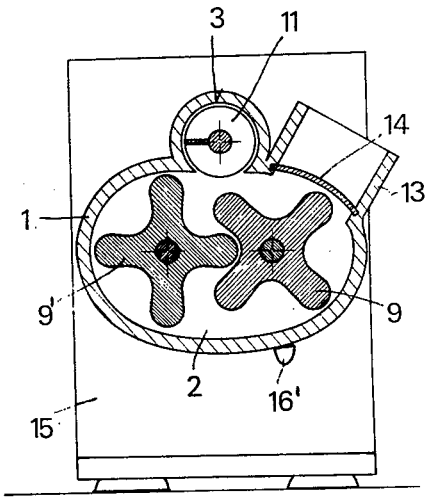

In the embodiment form illustrated in FIGS. 4 to 7 the body (1) of the machine is applied to the supporting base (15) in such a way that it can be rotated 180° about the axis y-y of the chamber (3) so that the conveyor member (6) is located above the kneading member (5) during the phase of kneading the dough—cf. FIG. 6—and vice versa during the subsequent phase of extrusion—cf. FIGS. 5 and 7.

In this case the gears constituting the kneader always rotate in the same direction, both during kneading and during the extrusion of the dough.

In particular, the position of the body (1) for the kneading phase can be defined, for example, by an arresting latch (16) mounted on the base and engaging the said body, while the extrusion position can be defined by a shoulder stop (16') which blocks the body in the position illustrated in FIGS. 5 and 7.

Substantially, for using the machine illustrated in FIGS. 4 to 7, before the ingredients are introduced, the body (1) is positioned in such a way that the screw conveyor (11) thereof is located above the kneading member (5) as illustrated in FIG. 6 and held in that position by means of the latch (16).

After the ingredients have been introduced into the chamber (2) through the mouth or opening (13) and the latter has been closed by means of the gate (14), kneading begins with the toothed wheels (9,9') but the dough does not pass into the chamber (3) of the screw conveyor (11) located above, which, despite the fact that it is rotating, does not produce any effect.

It should be noted, however, that notwithstanding what is stated above, during the kneading phase the screw conveyor can also remain stationary, i.e., not be driven so that it rotates.

Following a preestablished kneading period, the latch (16) is released either manually or automatically by appropriate means, so as to permit the body (1) to turn until it comes to a stop against the shoulder (16'), or in other words in the position in which—cf. FIGS. 2 to 4—the screw conveyor is displaced downward with respect to the kneading chamber. Under these conditions the dough, which is also favored by the rotation of the kneading rollers (9,9'), can gradually pass through the intermediate passage (4) from the chamber (2) to the chamber (3) in which the screw conveyor causes the dough to move toward the extruding plate for producing the pasta.

I claim:

1. A machine for kneading and extruding pasta said machine comprising a base, a body supported on said base and adapted to rotate about a horizontal axis, said body having two chambers each having a horizontal axis, an intermediate passage providing communication between said chambers, a first one of said chambers having an opening for the introduction of the ingredients to be kneaded into dough, said other chamber including an extruding die at one end thereof, kneading means mounted on the axis of said first chamber and a conveyor member mounted on the axis of said second chamber whereby said conveyor member is located above said kneading means during the kneading phase and said conveyor member is located below said kneading means during the phase of shaping the pasta by extrusion.

2. The machine according to claim 1 wherein said kneading means is comprised of two intermeshing gears.

3. The machine according to claim 1 wherein said conveyor member is comprised of a helical screw.

4. The machine according to claim 1, wherein said kneading means are arranged to rotate in one direction during the kneading phase, and are arranged to rotate in the opposite direction during the phase of extruding the dough through said extrusion die.

5. The machine according to claim 1, wherein said body is adapted to be rotated about the axis of said chamber in which said kneading means are mounted.

6. The machine according to claim 5, wherein said body is adapted to be rotated 180 degrees.

7. The machine according to claim 1, wherein said body is adapted to be rotated about the axis of said conveyor member.

8. The machine according to claim 7, wherein said body is adapted to be rotated 180 degrees.

9. The machine according to claim 1, wherein said body is adapted to be rotated 180 degrees about the horizontal axis on which said body pivots on said base.

10. The machine according to claim 1, wherein there is further included means for locking said body in the kneading position.

11. The machine according to claim 1, wherein there is further included means for locking said body in said extruding position.

12. The machine according to claim 1, wherein said conveyor rotates when said kneading means are operated.

13. The machine according to claim 1, wherein said conveyor is stationary when said kneading means are operated.

14. The machine according to claim 1, wherein said kneading chamber is larger then said extruding chamber.

15. The machine according to claim 1 wherein said extrusion die is removable and interchangeable with at least one other extrusion die.

* * * * *